(12) United States Patent
Zhang

(10) Patent No.: US 10,638,876 B2
(45) Date of Patent: May 5, 2020

(54) AUTOMATIC STIR-FRYER

(71) Applicant: Jianhao Zhang, New Taipei (TW)

(72) Inventor: Jianhao Zhang, New Taipei (TW)

( * ) Notice: Subject to any disclaimer, the term of this patent is extended or adjusted under 35 U.S.C. 154(b) by 362 days.

(21) Appl. No.: 15/687,441

(22) Filed: Aug. 26, 2017

(65) Prior Publication Data
US 2017/0354287 A1 Dec. 14, 2017

Related U.S. Application Data

(63) Continuation-in-part of application No. 14/373,148, filed on Dec. 18, 2014, now Pat. No. 9,775,466.

(51) Int. Cl.
*A47J 37/12* (2006.01)
*H05B 6/12* (2006.01)
*A47J 37/04* (2006.01)
*A47J 37/10* (2006.01)

(52) U.S. Cl.
CPC ......... *A47J 37/041* (2013.01); *A47J 37/1257* (2013.01); *A47J 37/1295* (2013.01); *H05B 6/12* (2013.01); *A47J 37/10* (2013.01)

(58) Field of Classification Search
CPC .... A47J 37/10; A47J 31/1257; A47J 31/1295; A47J 36/165; A47J 36/34; A47J 43/046; H05B 6/12
USPC ............ 99/348, 423, 424, DIG. 14; 219/621
See application file for complete search history.

(56) References Cited

U.S. PATENT DOCUMENTS

| | | | | |
|---|---|---|---|---|
| 4,173,925 A | * | 11/1979 | Leon | A47J 27/14 219/389 |
| 5,259,300 A | * | 11/1993 | Yajima | A47J 37/047 366/225 |
| 5,386,102 A | * | 1/1995 | Takikawa | H05B 6/1227 219/620 |
| 6,112,645 A | * | 9/2000 | Chang | A47J 37/1228 99/327 |
| 9,775,466 B2 | * | 10/2017 | Zhang | A47J 37/1242 |

* cited by examiner

*Primary Examiner* — Reginald Alexander

(57) ABSTRACT

Disclosed is an automatic stir-fryer comprising: a machine stand; a base pivotably provided on the machine stand; a rotary shaft providing rotary power and connected to a stir-frying rotary tank containing foodstuffs; a high-frequency induction heating unit coaxially covering the stir-frying rotary tank; a tilting unit pivotably disposed on the base; a receiving tank provided on the machine stand for receiving the cooked foodstuffs and controlled by an automatic push rod to move forward and backward; a cleaning unit assembled on the machine stand and corresponding to the stir-frying rotary tank after tilting by the tilting unit for water cleaning the stir-frying rotary tank; a control unit vertically disposed on the machine stand and provided with an control panel for controlling the operating time of the automatic stir-fryer and the temperature of the high-frequency induction heating unit.

14 Claims, 9 Drawing Sheets

AUTOMATIC STIR-FRYER

This application is a continuation-in-part of, and claims the benefit of priority to, Jianhao Zhang, U.S. patent application Ser. No. 14/373,148, filed Dec. 18, 2014.

FIELD OF THE INVENTION

The present invention relates to an automatic stir-fryer, in particular to an automatic stir-fryer capable of stir-frying and cooking in compliance with a series of actions of continuous production operations, and having benefits of easy to assemble and cost reduction through simplifying components and convenience to operate through automatic operations at mean time.

BACKGROUND OF THE INVENTION

Usually, cooking operations in the kitchen demand use of manpower or specially trained professional chef, to make various dishes and delicacies to solve a livelihood issue that people eat. During the cooking process, diverse cooking skills including a shallow frying, a cooking, a stir frying and a deep frying may be involved in. Therefore an ordinary person has to spend a lot of time and efforts to prepare a rich and savory meal.

Thus, it always encounters a manpower shortage for occasions that many people dine. Hence, fried machines are developed to assist chefs in cooking food. For instance, a Taiwan Patent Issue No. 359,084 regarding a structural improvement for a fired machine. It mainly discloses that a lifting rack is pivotably disposed on an upper edge of the machine frame. A rotary tank driven by a motor is disposed on the lifting rack. Multiple spiral blades are disposed on the inner wall of the rotary tank. A stove provides thermal heating to the rotary tank is disposed on the lifting rack. A lifting device is further disposed on the machine frame. The lifting device includes the motor having an output shaft. The output shaft is connected with a gear box. A guiding rod is driven by the gear box to move along an axial direction of the rotary tank. A guiding shaft is disposed on one end of the guiding rod. A lifting arm, other end of which arm is pivotably disposed on the lifting rack, is pivotably disposed on the guiding shaft.

A Taiwan Patent Issue No. 338,250 regarding a structural improvement for a fired machine. It includes a cylindrical frying pan; a rotary shaft pivotably penetrating the center of the cylindrical frying pan; a combined pan shovel disposed on the rotary shaft and situated in the cylindrical frying pan; a screen disposed on the external side of the cylindrical frying pan and a stove body disposed at the bottom side of the cylindrical frying pan; wherein for the combined pan shovel disposed on the rotary shaft, several sub-shovel parts with different shapes can be installed to a main shovel part; the stove body at the bottom side of the cylindrical frying pan has multiple stove nozzles which are disposed on a ring surface, which ring surface has a notch and appears a C-shaped accordingly.

However, the above-mentioned two kinds of fried machines are simply a machine for heating and stir-frying, although they can assist chefs to reduce the physical demanding, they are inconvenient for dishing up the cooked food and washing foodstuffs.

Therefore, a Taiwan Patent Issue No. 464,475 regarding an automatic design is proposed, which is an automatic stir-frying machine. A foodstuff input device, a deep frying equipment, a stove device, a cookware movement device, a dish output power device, a cleaning device, a stir-frying device and a control box are disposed in the machine frame, in cooperation with addition of a control circuit layout including a programmable controller PLC, micro switches and photoelectric switches, to perform an automatic stir-frying operation. However, the structure of this automatic stir-frying machine is really too complex and the stir-frying device lacks rotatable and rollable design so that the foodstuffs fail to be uniformly heated, which result in defects regarding differences in the degree of rare for the foodstuffs and the actual operation thereof is not good.

In view of the foregoing circumstances, the inventor has invested a lot of time to study the relevant knowledge, compare the pros and cons, research and develop related products. After quite many expetireents and tests, the "automatic stir-fryer" of this invention is eventually launched to improve the foregoing shortcomings, to meet the public use.

SUMMARY OF THE INVENTION

The technical issues the present invention intended to resolve are: to improve the defects regarding over-sophisticated structure, complex to assemble and expansive cost existing in the current automatic stir-fryer. Though the component and structure arrangements provided by the present invention, the simplified components in the present automatic stir-fryer can also perform a series of actions of continuous production operations.

In order to resolve the above-mentioned technical issues, the present invention provides the technical scheme as follows. An automatic stir-fryer, which comprises:

a machine stand having two lateral sides;

a base pivotably disposed on the machine stand, wherein a dynamic power source having a rotary shaft is disposed on the base and the rotary shaft is connected with a stir-frying rotary tank containing foodstuffs;

a high-frequency induction heating unit coaxially covering the stir-frying rotary tank;

a tilting unit disposed on the base for driving and pivoting the base to turn over and to return back to an original position;

a receiving tank disposed on the machine stand for receiving the foodstuffs dumped out from the stir-frying rotary tank and controlled by an automatic push rod to move forward and backward, wherein the receiving tanks is capable of being drew out from and stored in the machine stand automatically by the automatic push rod;

a cleaning unit disposed on the machine stand and situated in correspondence to the stir-frying rotary tank after being turned over for cleaning the stir-frying rotary tank;

a drying unit disposed on the machine stand and comprising a funnel-shape tank; and a control unit disposed on the machine stand and having a control panel for controlling an action period and a temperature for the automatic stir-fryer.

The further improvement for the above-mentioned technical scheme resides in that: the control unit further comprises a temperature transceiver for detecting a heating temperature for the stir-frying rotary tank.

The further improvement for the above-mentioned technical scheme resides in that: the tilting unit further comprises an actuator disposed at one of the two later sides of the machine stand, which actuator has a driving rod with a power output end, which power output end is pivotably connected with the base, so as to drive the base to turn over or to return back to the original position.

The further improvement for the above-mentioned technical scheme resides in that: the actuator is selected from one of a hydraulic cylinder and a screw linear actuator.

The further improvement for the above-mentioned technical scheme resides in that: the cleaning unit further comprises a water hose and an air hose for cleaning the stir-frying rotary tank.

The further improvement for the above-mentioned technical scheme resides in that: the high-frequency induction heating unit includes a circular frame and one pair of coils, the circular frame coaxially covers the stir-frying rotary tank, and the pair of the coils is arranged at two opposite sides of the circular frame respectively and electrically connected with a control unit.

The further improvement for the above-mentioned technical scheme resides in that: the drying unit further comprises a set of slide tracks disposed in the machine stand and situated under the receiving tank, a drawer recycling tank sliding on the set of slide tracks, which drawer recycling tank has a bottom opened with multiple apertures, and the funnel-shape tank disposed under the drawer recycling tank, for draining out the wasted water.

The further improvement for the above-mentioned technical scheme resides in that: the drying unit further comprises a set of slide tracks disposed in the machine stand and situated under the receiving tank, a drawer recycling tank sliding on the set of slide tracks, which drawer recycling tank has a bottom opened with multiple apertures, and the funnel-shape tank disposed under the drawer recycling tank, for draining out the wasted water.

The further improvement for the above-mentioned technical scheme resides in that: a looped guiding plate disposed under the receiving tank.

The further improvement for the above-mentioned technical scheme resides in that: a sensor disposed in correspondence to the receiving tank, wherein the sensor is electrically connected with the control unit for detecting whether a drew-out state or a stored-in state the receiving tank is currently to be placed in.

The present invention is mainly to dispose a base on a machine stand, and to dispose a stir-frying rotary tank which is rotatable in the base. A high-frequency induction heating unit covers the stir-frying rotary tank to perform heating for a stir-frying process. The cooked foodstuffs in the stir-frying rotary tank is dumped out into a receiving tank by a tilting unit, and then the rotary tank is washed and air-dried by a water spray and an air blow automatically provided from a cleaning unit. The leftovers after cooking drop into a leftover drying unit. In addition, the above-mentioned actions are controlled through a control unit disposed on the machine stand. Therefore, the foodstuffs can be easily and quickly heated through a series of continuous stir-frying action to achieve an effect that is easy to operate.

Wherein, a dynamic power source is disposed on the base, and a rotary shaft of the dynamic power source is connected with the stir-frying rotary tank, so as to drive the stir-frying rotary tank to rotate through the dynamic power source. Further, the high-frequency induction heating unit covers the stir-frying rotary tank and is disposed on the base. When the tilting unit drives the stir-frying rotary tank on the base to turn over, the high-frequency induction heating unit is turned over with the base at the same time.

Next, when the heating to the foodstuffs is completed, the tilting unit is activated. The tilting unit includes a pair of actuators disposed at two lateral sides of the machine stand. Power output ends of the actuators are pivotably connected with the base, to drive the base to turn over and return back to an original position by the actuators.

Next, the cleaning unit includes a water hose and an air hose, which is assembled on the machine stand and is in correspondence to the stir-frying rotary tank after turning over, to clean the stir-frying rotary tank by spraying water and blowing air.

The present automatic stir-fryer in this invention has a control unit. The control unit has a control panel, for controlling and setting up the operating period and operating temperature for the stir-fryer, which includes a dynamic power source operating period which dynamic power source drives the stir-frying rotary tank rotate, a high-frequency induction heating unit heating period and temperature, the actions of the actuators of the tiling unit and the period and sequence for spraying water and blowing air from the cleaning unit. The control unit is further connected with a temperature transceiver for detecting temperature of the stir-frying rotary tank and a sensor for detecting the movements of the receiving tank, so as to respectively obtain the current heating temperature from the temperature transceiver, for varying the flame temperature, and to sense the accomplishment of the stir-frying and the dishing up, for activating next cleaning process.

In comparison to the current technologies, the present invention has benefits as follows.

(1) The present automatic stir-fryer is capable of achieving technical effect regarding automatic stir-frying, through a series of actions of continuous production operations.

(2) The present automatic stir-fryer is capable of owning effects regarding easy to be assembled and cost reduction, through simplifying the entire components.

(3) The present automatic stir-fryer is capable of causing the foodstuffs to be uniformly heated by rotating the stir-frying rotary tank to ensure the cooked foodstuffs delicious.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
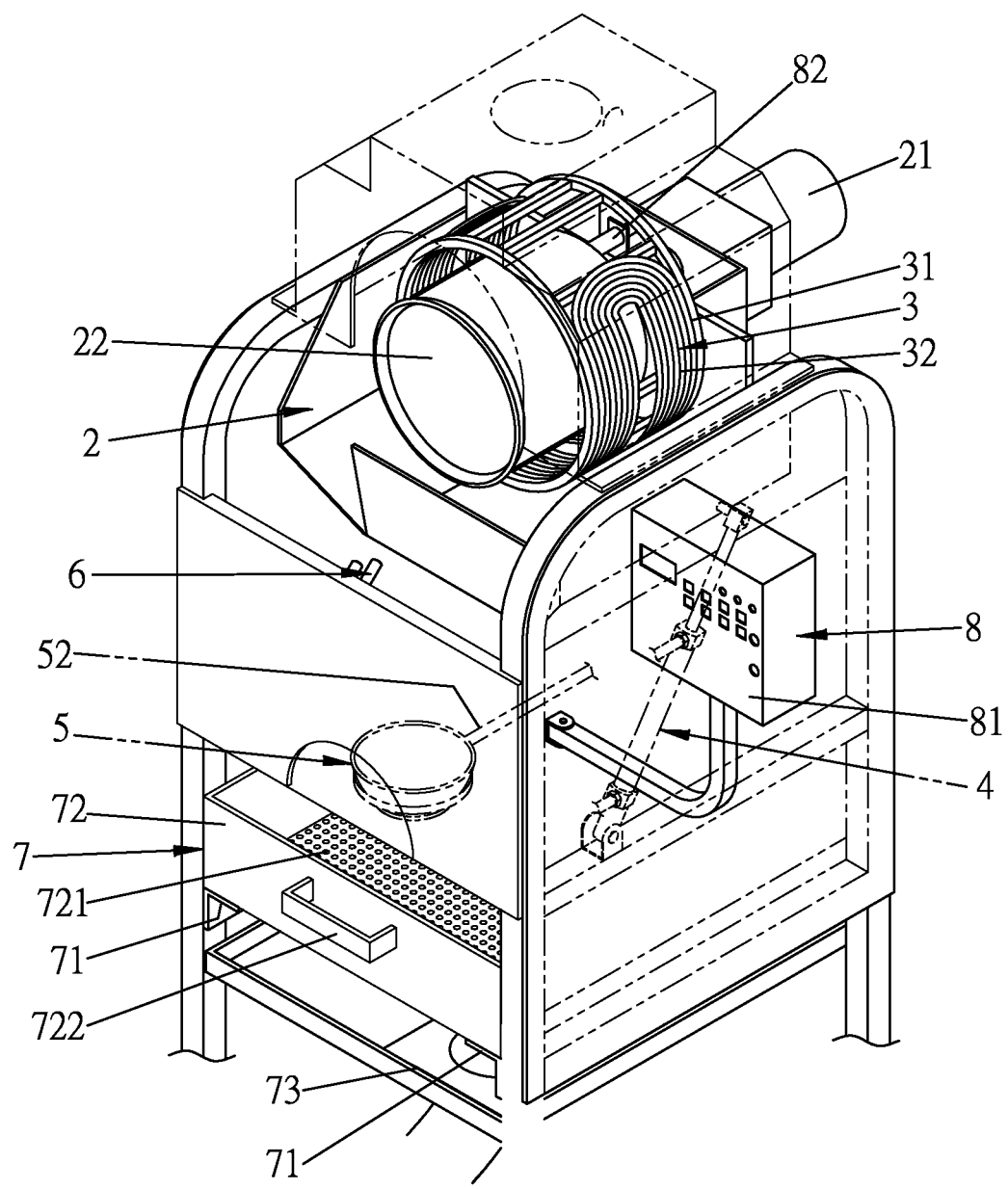
FIG. 1 shows a three-dimensional schematic diagram illustrating an automatic stir-fryer in accordance with the present invention.

Referring now to the drawings where like characteristics and features among the various figures are denoted by like reference characters.

Figure 2:
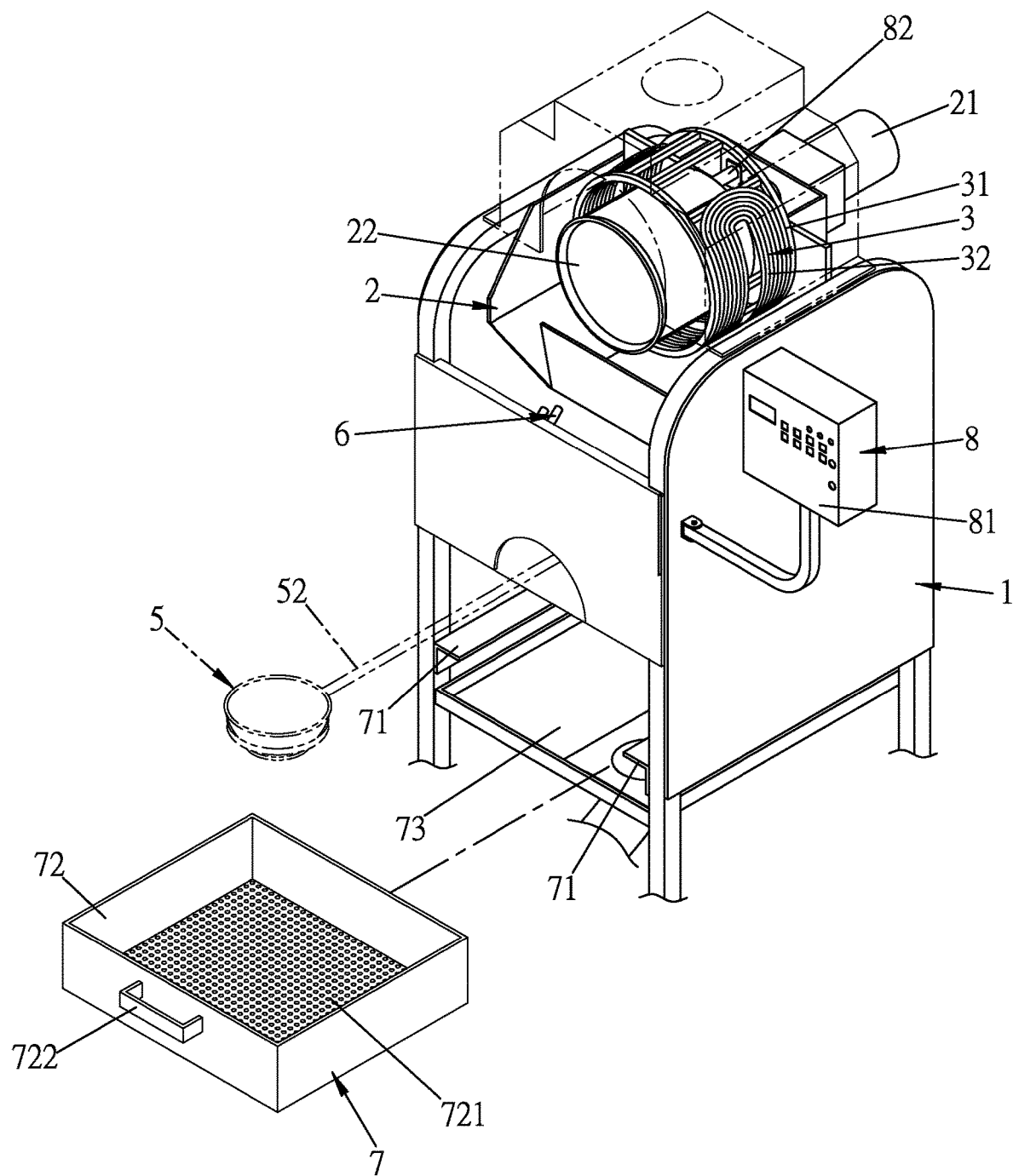
FIG. 2 shows a partial decomposition schematic diagram illustrating an automatic stir-fryer in accordance with the present invention.
Figure 3:
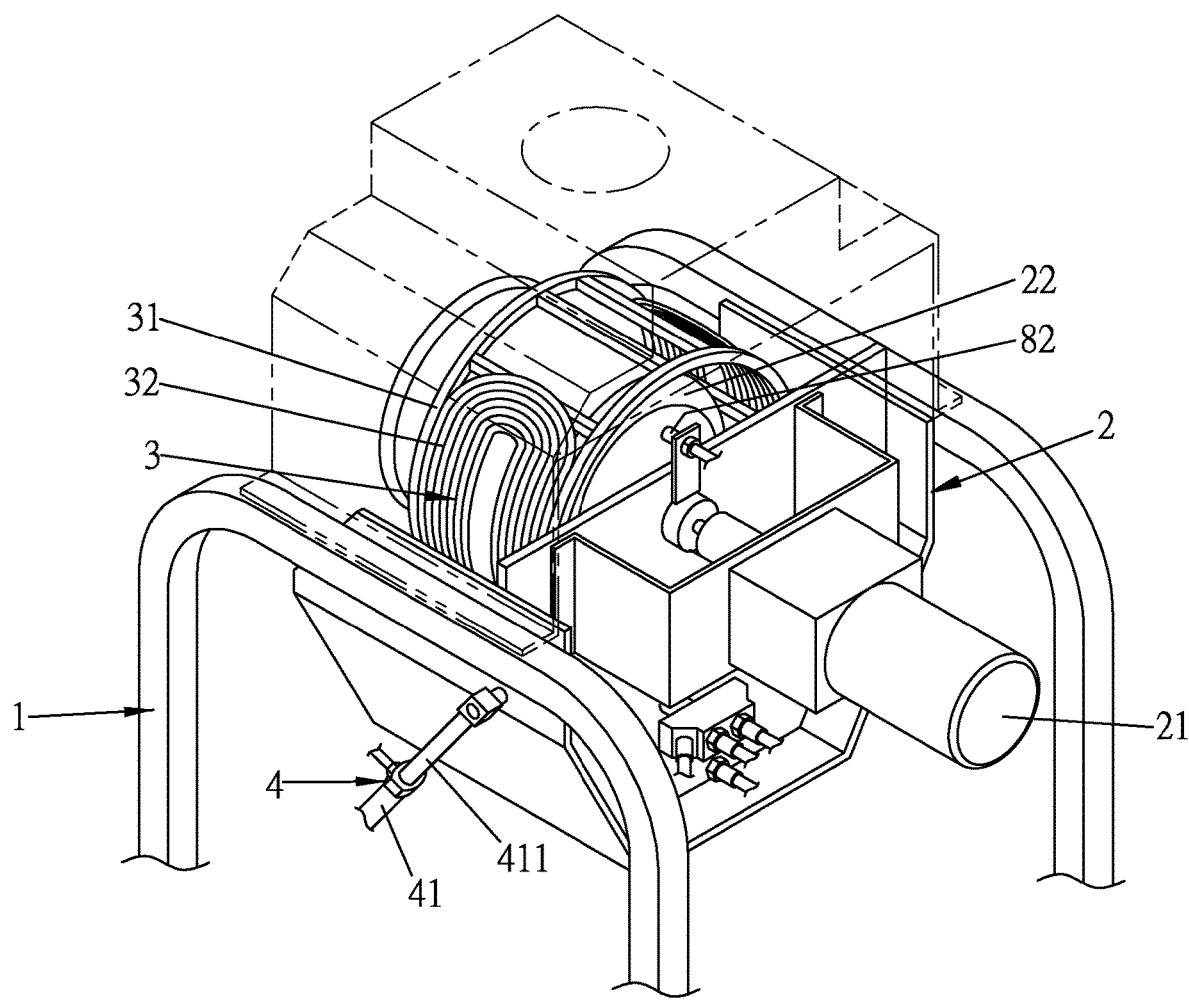
FIG. 3 shows a rear-view schematic diagram illustrating an automatic stir-fryer in accordance with the present invention.
Figure 4:
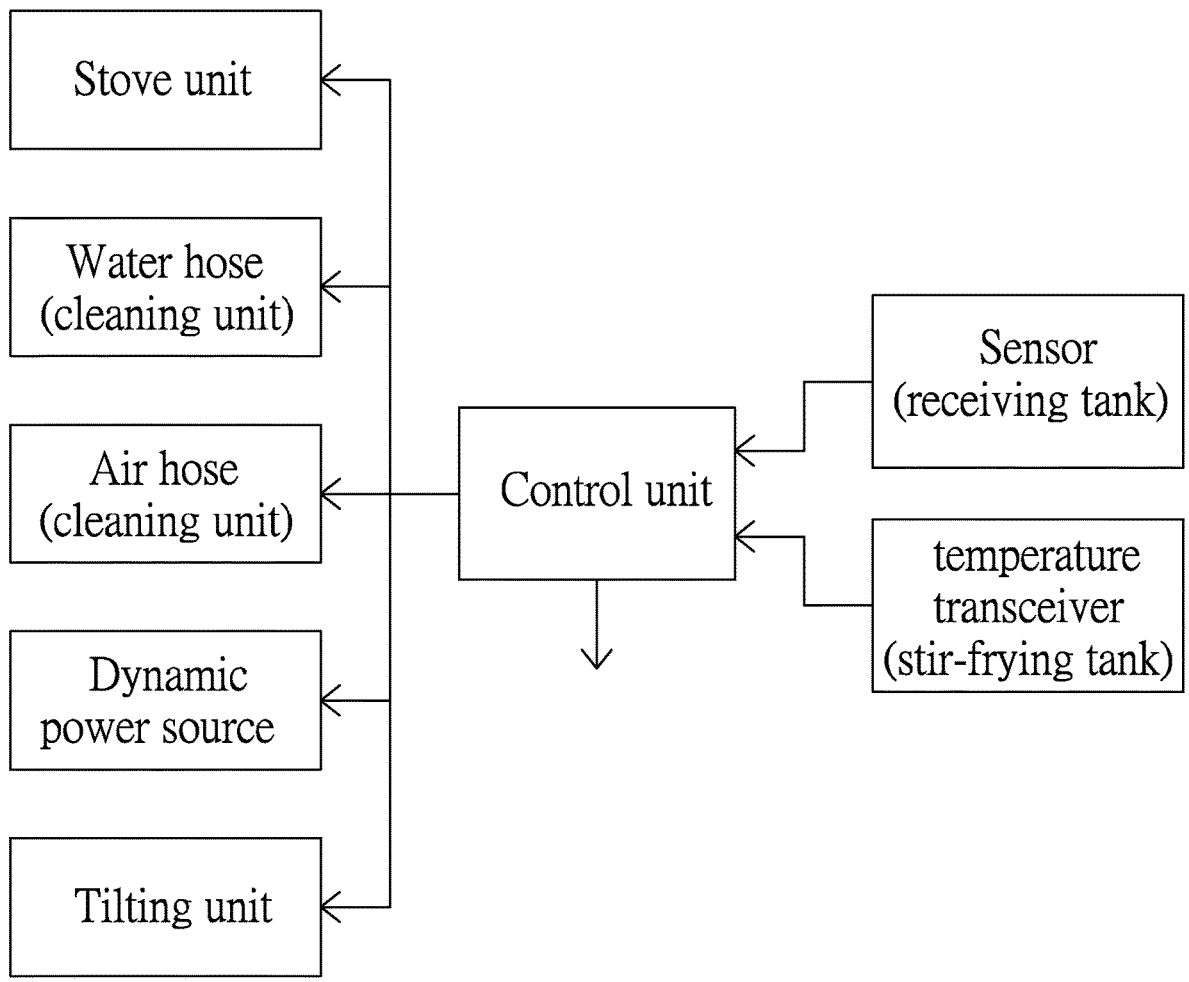
FIG. 4 shows a schematic diagram illustrating a control unit in accordance with the present invention.
Figure 5:
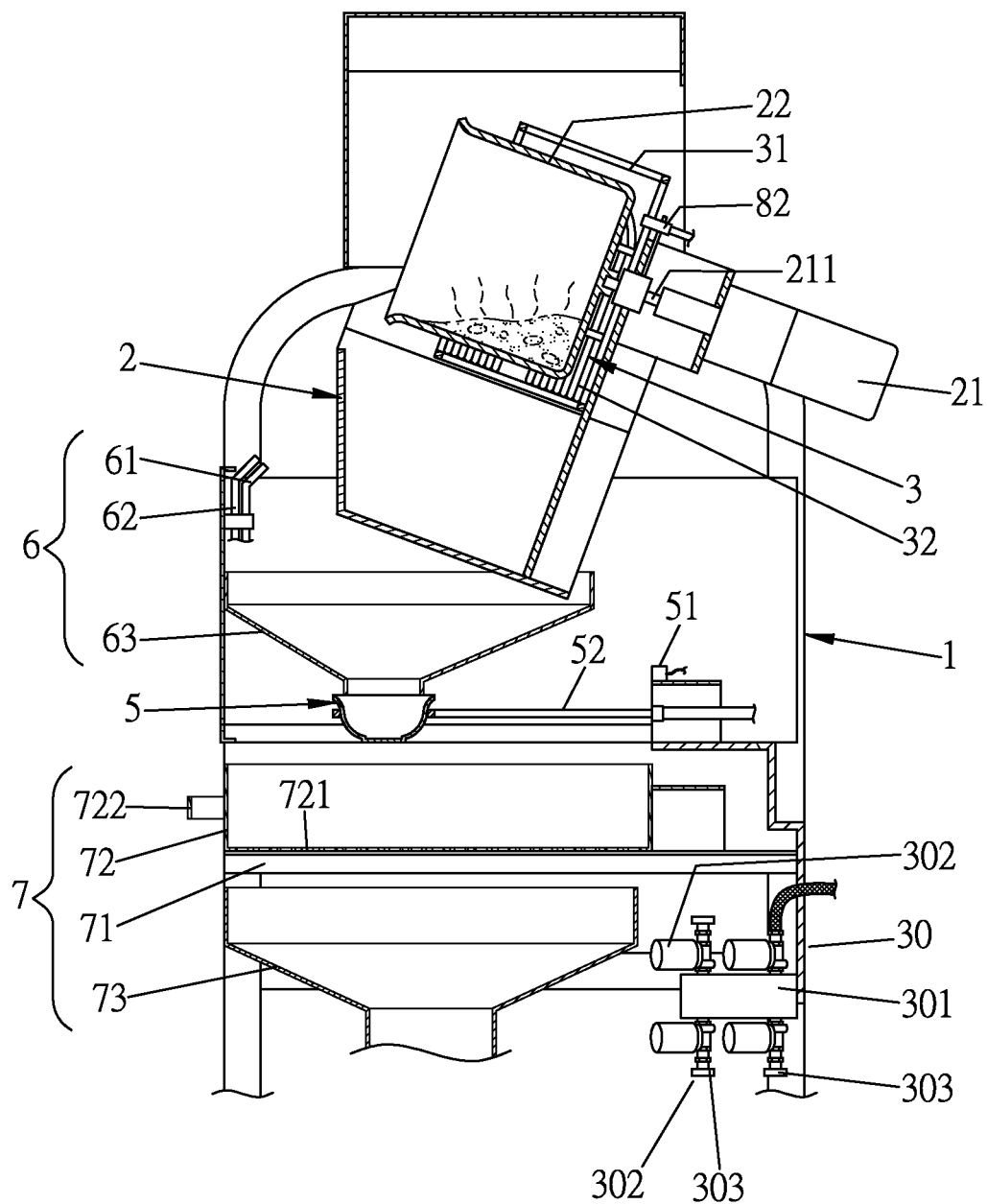
FIG. 5 shows a schematic diagram illustrating a thermal power adjusting unit in accordance with the present invention.
Figure 6:
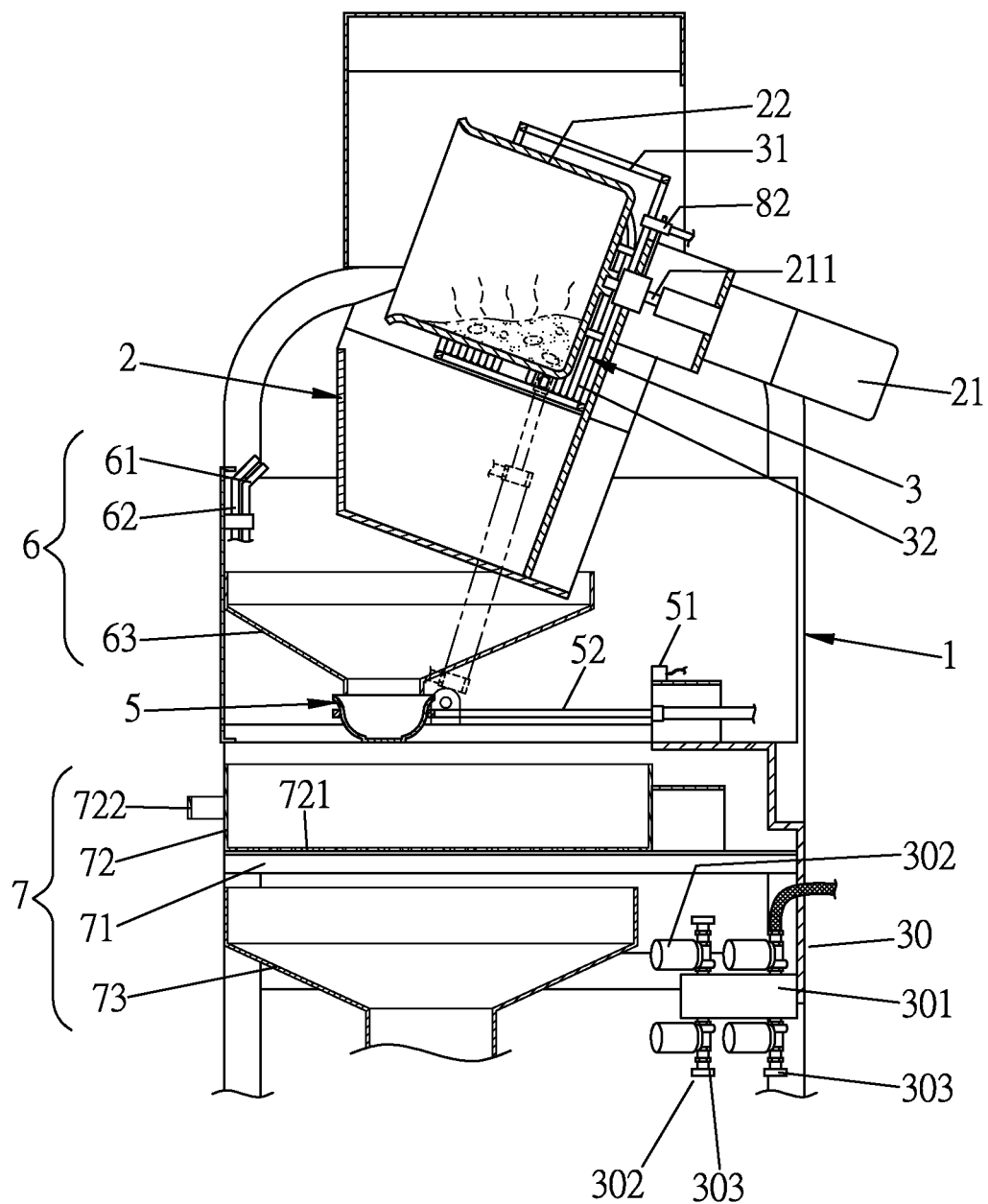
FIG. 6 shows a schematic diagram illustrating a first use state for the automatic stir-fryer in accordance with the present invention.
Figure 7:
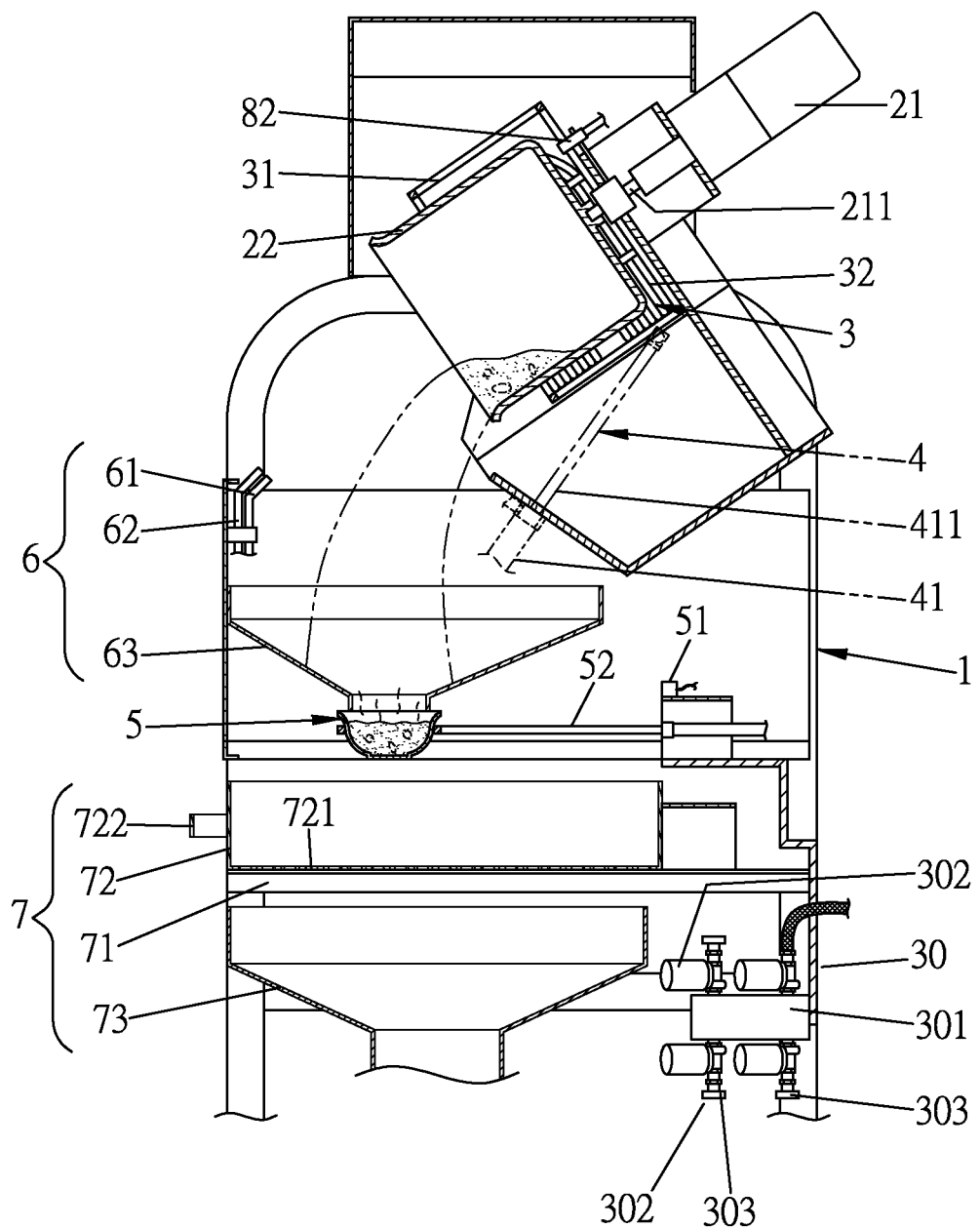
FIG. 7 shows a schematic diagram illustrating a second use state for the automatic stir-fryer in accordance with the present invention.
Figure 8:
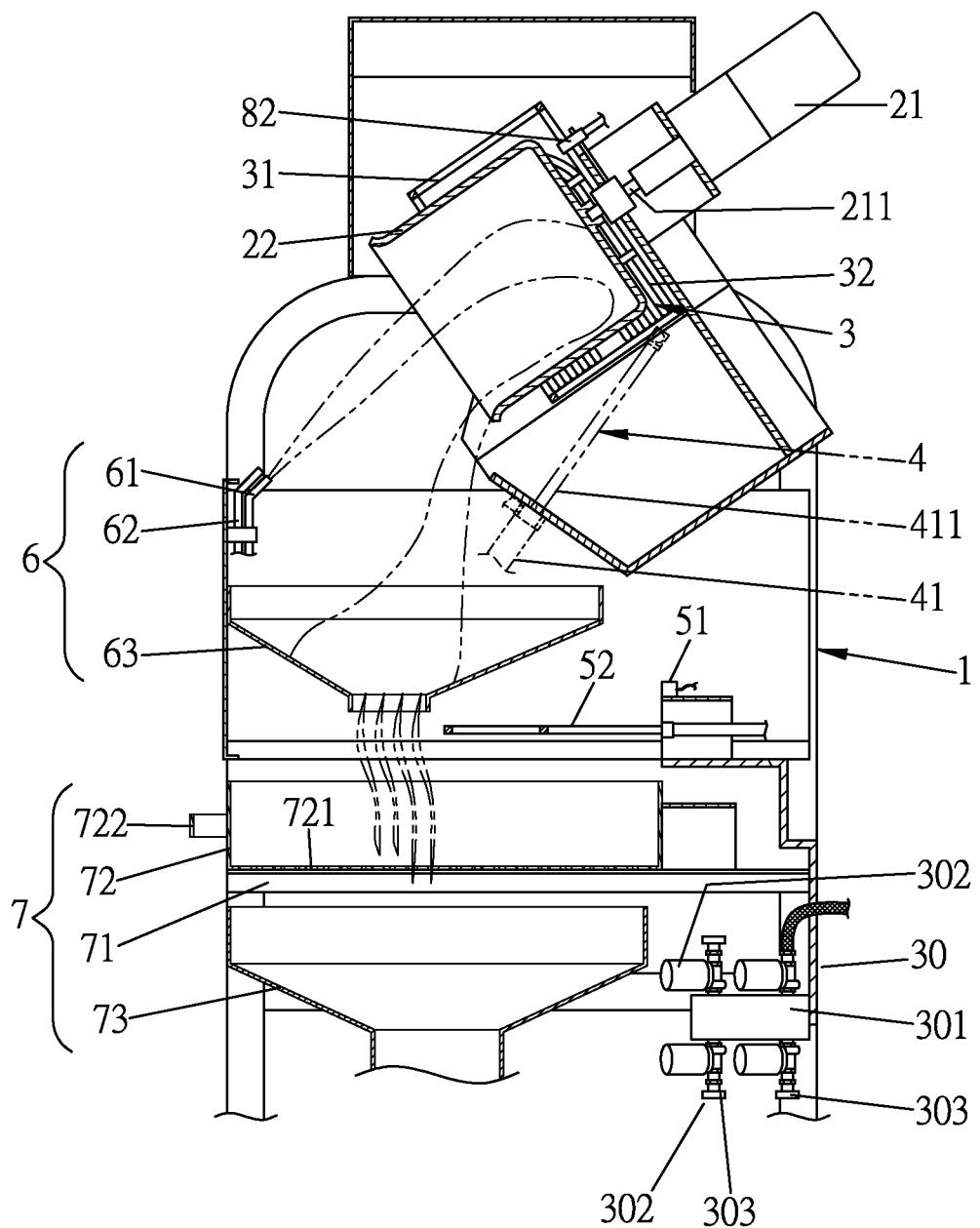
FIG. 8 shows a schematic diagram illustrating a third use state for the automatic stir-fryer in accordance with the present invention.
Figure 9:
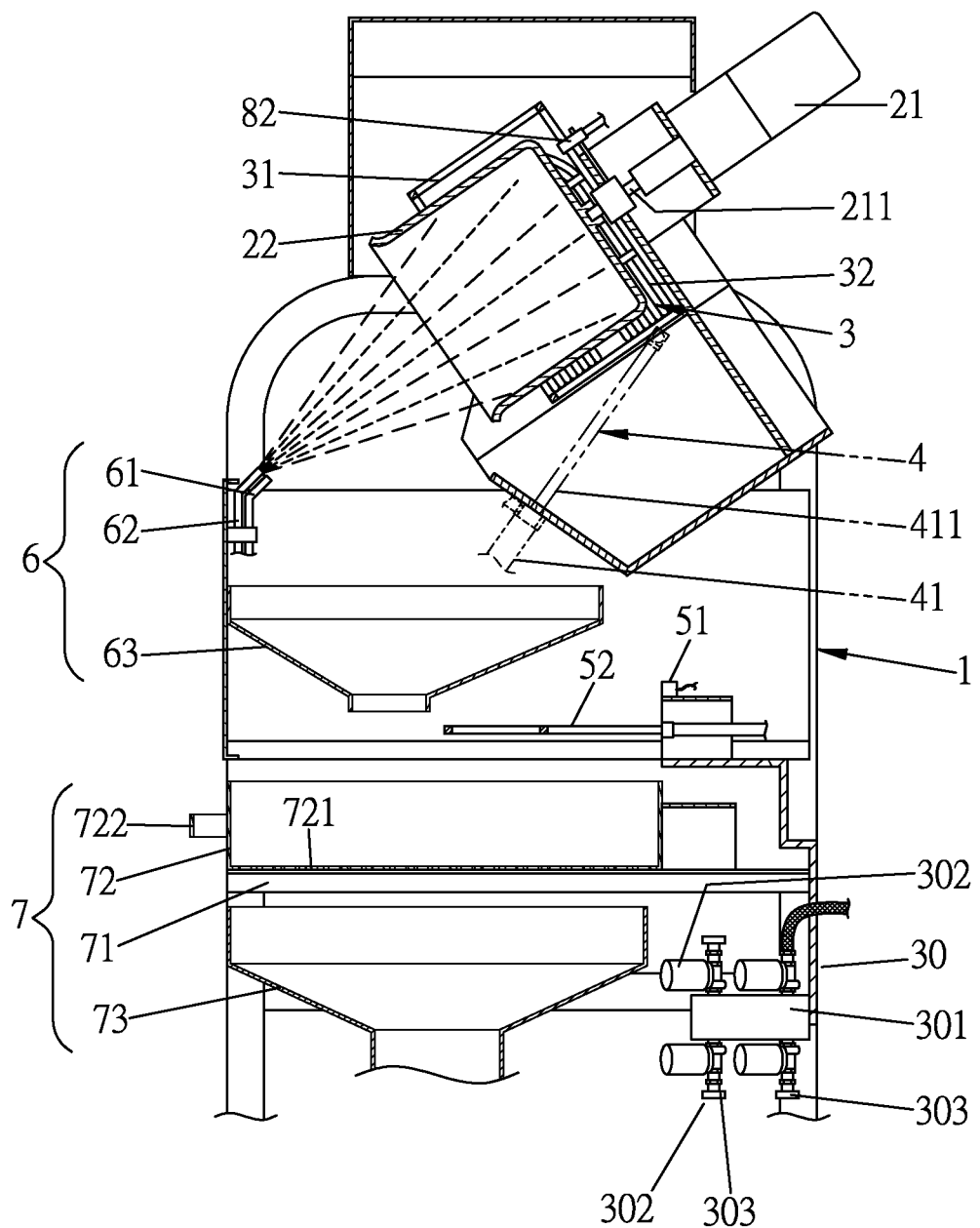
FIG. 9 shows a schematic diagram illustrating a fourth use state for the automatic stir-fryer in accordance with the present invention.

Please refer to FIG. 1 to FIG. 9. The present invention provides an automatic stir-fryer, which includes a machine stand 1, a base 2, a high-frequency induction heating unit 3, a tilting unit 4, a receiving tank 5, a cleaning unit 6, a drying unit 7 and a control unit 8.

The base 2 is pivotably disposed on the machine stand 1 correspondingly, and a dynamic power source 21 is disposed on the base 2. The dynamic power source 21 has a rotary shaft 211 which is correspondingly connected with a stir-frying rotary tank 22 used for containing foodstuffs or food ingredients.

The high-frequency induction heating unit 3 is correspondingly disposed on the base 2 and covers the stir-frying rotary tank 22.

The high-frequency induction heating unit 3 includes a circular frame 31 and one pair of coils 32. The circular frame 31 coaxially covers the stir-frying rotary tank 22. The pair of the coils is arranged at two opposite sides of the circular frame 31 respectively and electrically connected with the control unit 8.

The tilting unit 4 includes a pair of actuators 41, which are disposed on the respective two lateral sides of the machine stand 1 respectively. The respective actuators 41 have a driving rod 411 with a power output end, which power output end is pivotably connected with the base 2, so that the actuators 41 can drive the base 2 to turn over or to return back to the original position.

The receiving tank 5 is correspondingly disposed in the machine stand 1 to receive and load up the heated and cooked foodstuffs which are dumped out from the stir-frying rotary tank 22. The receiving tank 5 is controlled by an automatic push rod 52 to move forward and backward. That is, the receiving tank 5 is capable of being drawn out from and stored in the machine stand 1 automatically by the automatic push rod 52. In correspondence to the receiving tank 5, a sensor 51 is disposed on the machine stand 1 to correspondingly detect and monitor the movements of the receiving tank 5.

The cleaning unit 6, which includes a water hose 61 and an air hose 62, is disposed at where is corresponding to the stir-frying rotary tank 22 on the machine stand 1, so as to clean the stir-frying rotary tank 22 by watering and blowing.

The drying unit 7 includes a funnel-shape tank 73 used for directing the wasted water to flow into the leftovers collecting tank.

The drying unit 7 further includes a set of slide tracks 71 disposed below the receiving tank 5 under the machine stand 1.

The drying unit 7 further includes a drawer recycling tank 72 capable of sliding on the slide tracks 71 for being drew out from or pushed back into the machine stand 1. The drawer recycling tank 72 has a bottom side which is opened with multiple apertures 721. A funnel-shape tank 73 is disposed under the drawer recycling tank 72 on the machine stand 1 in order to drain out the wasted water.

The control unit 8 which is correspondingly disposed on the machine stand 1 has a control panel 81 and a temperature transceiver 82 for detecting the temperature for the heated stir-frying rotary tank 22. The control unit 8 is used for controlling the action period of the automatic stir-fryer and the temperature of the strove unit 3.

Please refer to FIG. 1 to FIG. 9. The automatic stir-fryer is applicable to stir-fry massive foodstuffs or food ingredients or to heat up the half-baked foodstuffs, the medium-rare foodstuffs, the instant foods or the ready-cooked products.

Prior to using, multiple sets of electromagnetic valves 302 are disposed on the main rack 301 of the thermal power adjusting unit 30. There are totally four sets of electromagnetic valves 302 shown in FIGS. The way to adjust the four sets is mainly to revolve the tuning knobs 303 disposed on the respective electromagnetic valves 302 on the main rack 301, so as to adjust the gaseous discharges respectively and correspondingly (the thermal power source is preferably selected from a group consisting of a natural gas, a liquefied natural gas and a liquefied petroleum gas, which is not shown in Figs.). In this embodiment, there are four different thermal power stages including a fully-opened discharge stage, a large-flame discharge stage, a middle-flame discharge stage and a small-flame discharge stage provided for the respective valves. As if the foodstuffs to be cooked demand more accurate and multi-level variety for the cooking temperature, the numbers of the sets of the electromagnetic valves 302 can be increased. The numbers of the sets of the electromagnetic valves 302 can be varied upon the actual demanding. After then, the thermal power adjusting unit 30 is connected with the control unit 8 on the automatic stir-fryer.

While using, the foodstuffs under cooking such as, the half-baked, the medium-rare foodstuffs, the instant food and the ready-cooked foodstuffs, are placed into the stir-frying rotary tank 22 disposed on the base 2 on the machine stand 1. Then, the required heating period and temperature are set up by operating the control panel 81 on the control unit 8 in accordance with the different foodstuffs under cooking. The dynamic power source 21 is further set with different rotating speed (for example, some sorts of foodstuffs cannot bear over heating which requires quick rotation). After being activated, the rotary shaft 211 of the dynamic power source 21 drives the stir-frying rotary tank 22 to be revolved and rolled. The high-frequency induction heating unit 3 correspondingly provides the heat with appropriate temperature to heat up the foodstuffs under cooking in the stir-frying rotary tank 22, in which the heating process is mainly determined in accordance with the set numeric by the control unit 8. For example, as if some sorts of foodstuffs can hardly bear long-term period heating which requires quickly stir-frying with fully-opened flames to keep and maintain crisp and fresh, the electromagnetic valves 302 are set to be fully opened within a short time interval to provide an intense and quick full-flame thermal power pulse lasting for few seconds (the other large-flame stage, middle-flame and small-flame discharges electromagnetic valves 302 are closed). Alternatively, while some sorts of foodstuffs require to be stewed by a gentle heating thermal power for a relatively long time to keep fresh and delicious, a full-flame thermal power is first provided until boiled through the fully-opened discharge electromagnetic valve 302. The boiled temperature can be detected by the temperature transceiver 82 disposed behind the stir-frying rotary tank 22 and then be sent back to the control unit 8. Next, the control unit 8 commands to switch off the fully-opened discharge electromagnetic valve 302 and then commands to provide thermal flames by the small-flame discharge electromagnetic valve 302 (the other large discharge stage, small discharge stage and fully-opened discharge stage electromagnetic valves 302 are closed).

During the stir-frying rotary tank 22 is being heated by the strove unit 3 for performing the above-mentioned actions, the temperature transceiver 82 in the control unit 8 continuously detects the temperature on the stir-frying rotary tank 22. If the heating temperature on the stir-frying rotary tank 22 reaches a predetermined temperature and heating period, the stir-frying process is completely finished. While the heating process is completed, the control unit 8 commands to activate the tilting unit 4, to cause the driving rods 411 of both actuators 41 to be moved up to jack up the base 2, whereby the stir-frying rotary tank 22 is thus turned over and the cooked foodstuffs are dumped out. The cooked foodstuffs drop down to the receiving tank 5 and the receiving tank 5 is drew out automatically by the automatic push rod 52 after then (the cooked foodstuffs is ready to eat). The sensor 51 used for detecting the movements correspondingly generates and sends a signal back to the control unit 8. Next, the control unit 8 commands to activate the cleaning unit 6, to cause the water hose 61 to spray out clean water to wash away the leftovers attached and remained on the inner wall of the stir-frying rotary tank 22. A looped guiding plate 63 for directing the wasted water carrying the leftovers is disposed under the water hose 61. Then the air hose 62 blows out massive and compressed air, to air-dry the remaining moisture contents in the tank to ensure the smells of previous foodstuffs to not remain in the tank.

The wasted water blended with leftovers of the foodstuffs after cleaning is directed to pass through the drying unit 7 on the machine stand 1 to process leftovers. The drawer recycling tank 72 is arranged to move by the sets of slide tracks 71 to receive the wasted water containing with leftovers after cleaning. The wasted water flows out through the multiple apertures 721 opened on the drawer recycling tank 72 and drains out by passing though the funnel-shape tank 73, in which the dehydrated solid leftovers are left in the drawer recycling tank 72. While an adequate amount of solid leftovers are accumulated in the tank, the drawer recycling tank 72 can be pulled out by using the handle 722 disposed on the drawer recycling tank 72 and the dried solid leftovers are then dumped into the leftovers collecting tank. The wasted water processing equipment, such as a ditch or a recycling tank, can be used for receiving the emission of wasted water.

In addition, during the stir-frying process for the stir-frying rotary tank 22, the cooking and smoking smells might be generated. Thus, a smoke damper can be disposed right above the stir-frying rotary tank 22 (shown as where the broken lines marked), to eliminate and to exclude such peculiar smells.

The above-mentioned disclosure is described with respect to particular embodiments and with reference to certain drawings, but the disclosure is not limited thereto but is only limited by the claims.

It is clear that other embodiments can be configured according to the knowledge of persons skilled in the art without departing from the true technical teaching of the present disclosure.

In comparison to the current technologies, the present invention has benefits as follows.

(1) The present automatic stir-fryer is capable of achieving technical effect regarding automatic stir-frying, through a series of actions of continuous production operations.

(2) The present automatic stir-fryer is capable of owning effects regarding easy to be assembled and cost reduction, through simplifying the entire components.

(3) The present automatic stir-fryer is capable of causing the foodstuffs to be uniformly heated by rotating the stir-frying rotary tank to ensure the cooked foodstuffs delicious.

To sum up, the disclosed embodiments in the present invention are capable of duly achieving anticipated technical effects. It is not only the disclosed specific architecture never disclosed in the same art field, but also never disclosed before filed, which is completely in compliance with related requirements and regulations in patent act and patent implementation. It sincerely requests the present invention to be granted a patent right.

What is claimed is:

1. An automatic stir-fryer, comprising:
    a machine stand having two lateral sides;
    a base pivotably disposed on the machine stand, wherein a dynamic power source having a rotary shaft is disposed on the base and the rotary shaft is connected with a stir-frying rotary tank containing foodstuffs;
    a high-frequency induction heating unit coaxially covering the stir-frying rotary tank;
    a tilting unit disposed on the base for driving and pivoting the base to turn over and to return back to an original position;
    a receiving tank disposed on the machine stand for receiving the foodstuffs dumped out from the stir-frying rotary tank and controlled by an automatic push rod to move forward and backward, wherein the receiving tank is capable of being drew out from and stored in the machine stand automatically by the automatic push rod;
    a cleaning unit disposed on the machine stand and situated in correspondence to the stir-frying rotary tank after being turned over for cleaning the stir-frying rotary tank; a drying unit disposed on the machine stand and comprising a funnel-shape tank; and
    a control unit disposed on the machine stand and having a control panel for controlling an action period and a temperature for the automatic stir-fryer.

2. The automatic stir-fryer as claimed in claim 1, wherein the control unit further comprises a temperature transceiver for detecting a heating temperature for the stir-frying rotary tank.

3. The automatic stir-fryer as claimed in claim 1, wherein the tilting unit further comprises an actuator disposed at one of the two later sides of the machine stand, which actuator has a driving rod with a power output end, which power output end is pivotably connected with the base, so as to drive the base to turn over or to return back to the original position.

4. The automatic stir-fryer as claimed in claim 3, wherein the actuator is selected from one of a hydraulic cylinder and a screw linear actuator.

5. The automatic stir-fryer as claimed in claim 1, wherein the cleaning unit further comprises a water hose and an air hose for cleaning the stir-frying rotary tank.

6. The automatic stir-fryer as claimed in claim 2, wherein the cleaning unit further comprises a water hose and an air hose for cleaning the stir-frying rotary tank.

7. The automatic stir-fryer as claimed in claim 1, wherein the high-frequency induction heating unit includes a circular frame and one pair of coils, the circular frame coaxially covers the stir-frying rotary tank, and the pair of the coils is arranged at two opposite sides of the circular frame respectively and electrically connected with the control unit.

8. The automatic stir-fryer as claimed in claim 5, wherein the high-frequency induction heating unit includes a circular frame and one pair of coils, the circular frame coaxially covers the stir-frying rotary tank, and the pair of the coils is arranged at two opposite sides of the circular frame respectively and electrically connected with a control unit.

9. The automatic stir-fryer as claimed in claim 1, wherein the drying unit further comprises a set of slide tracks disposed in the machine stand and situated under the receiving tank, a drawer recycling tank sliding on the set of slide tracks, which drawer recycling tank has a bottom opened with multiple apertures, and the funnel-shape tank disposed under the drawer recycling tank, for draining out the wasted water.

10. The automatic stir-fryer as claimed in claim 2, wherein the drying unit further comprises a set of slide tracks disposed in the machine stand and situated under the receiving tank, a drawer recycling tank sliding on the set of slide tracks, which drawer recycling tank has a bottom opened with multiple apertures, and the funnel-shape tank disposed under the drawer recycling tank, for draining out the wasted water.

11. The automatic stir-fryer as claimed in claim 3, wherein the drying unit further comprises a set of slide tracks disposed in the machine stand and situated under the receiving tank, a drawer recycling tank sliding on the set of slide tracks, which drawer recycling tank has a bottom opened with multiple apertures, and the funnel-shape tank disposed under the drawer recycling tank, for draining out the wasted water.

12. The automatic stir-fryer as claimed in claim 7, wherein the drying unit further comprises a set of slide tracks disposed in the machine stand and situated under the receiving tank, a drawer recycling tank sliding on the set of slide tracks, which drawer recycling tank has a bottom opened with multiple apertures, and the funnel-shape tank disposed under the drawer recycling tank, for draining out the wasted water.

13. The automatic stir-fryer as claimed in claim 1, further comprising a looped guiding plate disposed under the water hose.

14. The automatic stir-fryer as claimed in claim 1, further comprising a sensor disposed in correspondence to the receiving tank, wherein the sensor is electrically connected with the control unit for detecting whether a drew-out state or a stored-in state the receiving tank is currently to be placed in.

* * * * *